July 14, 1964

R. A. MARR 3,140,768

MOBILE LOADER

Filed Dec. 4, 1961

INVENTOR.
ROBERT A. MARR
BY *Raphael Semmes*
ATTORNEY

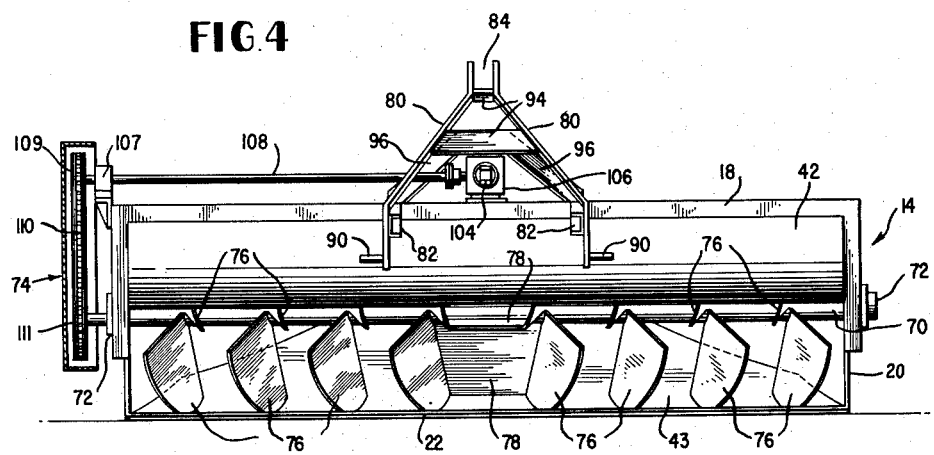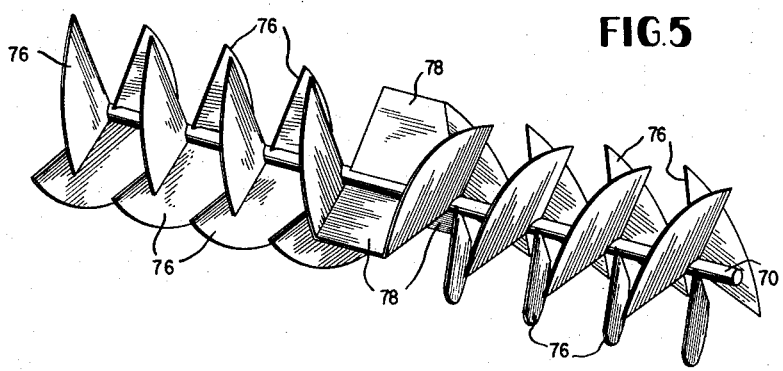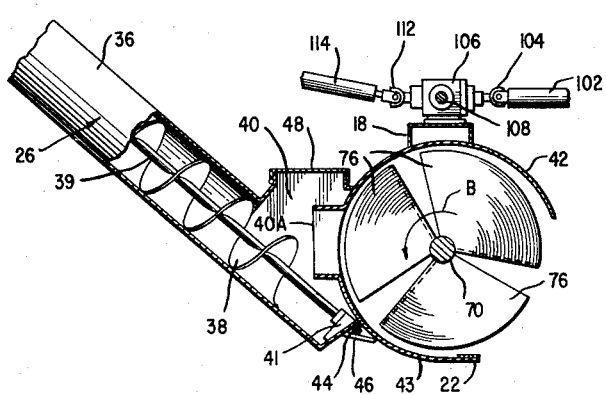

July 14, 1964  R. A. MARR  3,140,768
MOBILE LOADER
Filed Dec. 4, 1961  3 Sheets-Sheet 3

INVENTOR.
ROBERT A. MARR
BY Raphael Semmes
ATTORNEY

United States Patent Office 3,140,768
Patented July 14, 1964

3,140,768
MOBILE LOADER
Robert A. Marr, Rte. 3, Box 84, Winnsboro, Tex.
Filed Dec. 4, 1961, Ser. No. 156,906
4 Claims. (Cl. 198—7)

This invention relates to loaders, and more particularly to mobile apparatus for collecting, treating, and conveying material. While the invention has broader applicability, it is principally intended for use in processing chicken house litter and cow manure. The invention facilitates the utilization of these waste products as fertilizer by collecting, and comminuting the material and by conveying the material to a suitable receiver, such as a fertilizer distributor.

This application is a continuation-in-part of S.N. 100,346 filed April 3, 1961, now abandoned.

Prior to the present ivention the foregoing tasks have been performed by hand or by cumbersome, rudimentary machinery. It is a principal object of the invention to provide a simple and economical apparatus for the performance of these tasks in an efficient manner.

Another object of the invention is to provide apparatus of the foreoing type which is constructed for use with a conventional farm tractor, so that an additional source of motive power is not required.

A more specific object of the invention is to provide apparatus of the foregoing type which may be readily towed and driven by a conventional farm tractor and which has provision for the towing of a material receiver, such as a fertilizer distributor.

Another object of the invention is to provide apparatus of the foregoing type which cuts a wide swath through the collected material and which comminutes and conveys the material for discharge at a convenient location.

A still further object of the invention is to provide apparatus of the foregoing type having collector means which may be readily adjusted in height and orientation by the use of conventional farm tractor mechanisms.

An additional object of the invention is to provide apparatus of the foregoing type employing a horizontal conveyor of unique construction permitting the simultaneous transportation and comminuting of the collected material.

A still further object of the invention is to provide apparatus of the foregoing type employing uniquely related horizontal and elevating conveyors.

Yet another object of the invention is to provide apparatus of the foregoing type in which the elevation of the elevating conveyor may be readily varied.

A still further object of the invention is to provide apparatus of the foregoing type which is versatile and stable.

Briefly stated, and without limitation, the present invention is concerned with apparatus having a tractor-drawn carriage which supports a transverse horizontal conveyor and an elevating conveyor. The conveyors are driven from the power take-off of the tractor. As the apparatus of the invention is drawn along the ground, a blade dislodges material in the path of the apparatus so that the material may be picked up by the horizontal conveyor and supplied to the elevating conveyor, the material being comminuted during horizontal movement. The discharge of the elevating conveyor is supplied to a suitable receiver, which may be towed by the apparatus of the invention.

The foregoing and other objects, advantages, and features of the invention, and the manner in which the same are accomplished will become more readily apparent upon consideration of the following detailed description of the invention taken in conjunction with the accompanying drawings, which illustrate preferred and exemplary embodiments, and wherein:

FIGURE 4 is a front elevation view (partly sectional) of the apparatus of FIGURE 2 with the elevating conveyor deleted for clarity of illustration;

FIGURE 5 is a perspective view of a preferred form of horizontal conveyor in accordance with the invention;

FIGURE 6 is a fragmentary vertical sectional view illustrating the relationship of horizontal and elevating conveyors of the invention as well as details of the drive train;

Figure 1:
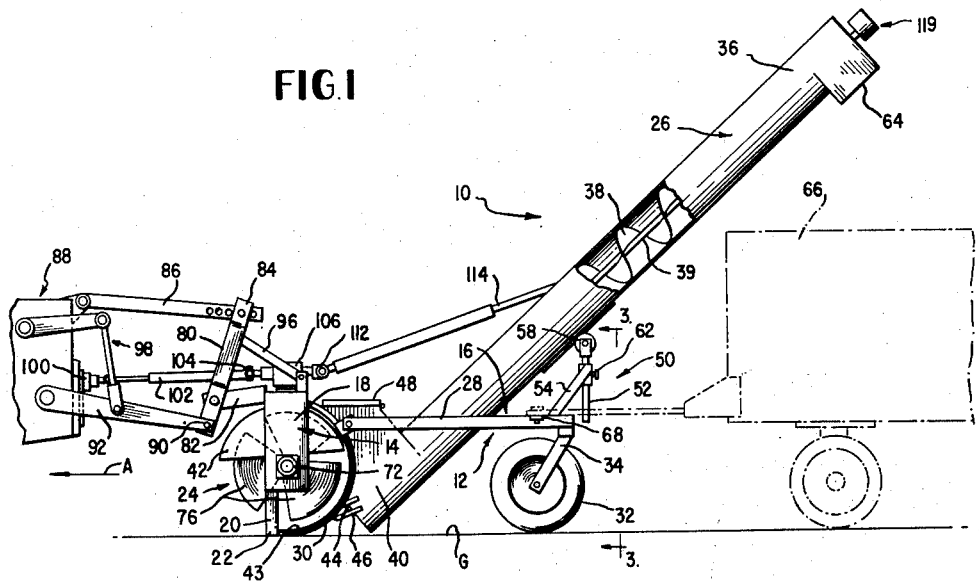
FIGURE 1 is a side elevation view illustrating a preferred form of the apparatus of the invention in conjunction with cooperating portions of the towing tractor and the towed material receiver.

Referring to the drawings, and initially to FIGURE 1 thereof, in a preferred form the loader apparatus 10 of the invention comprises a carriage generally designated 12 including a transverse frame 14 at the front of the carriage and a longitudinal frame 16 extending rearwardly from the central portion of the transverse frame. The major structural elements of the apparatus are preferably formed of a strong metal such as steel. In the form shown the transverse frame comprises an inverted U-shaped sturdy member 18 the vertical legs of which are attached to a lighter U-shaped member 20 (see FIG. 4). The horizontal portion of member 20 constitutes or has affixed thereto a blade 22 which is adapted to move along the ground G (FIG. 1) and dislodge material in the path of the loader as the loader is moved in the direction of the arrow A. The carriage 12 supports a horizontal conveyor 24 which will be described in greater detail hereinafter. The carriage also supports an elevating conveyor 26 which will also be further described.

Figure 2:
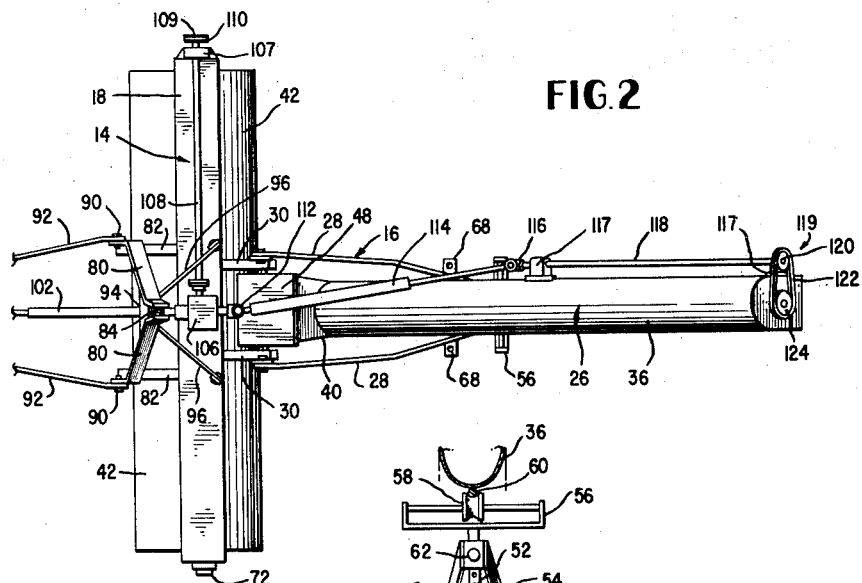
FIGURE 2 is a plan view of the apparatus of FIGURE 1 with certain parts deleted for clarity of illustration.
Figure 3:
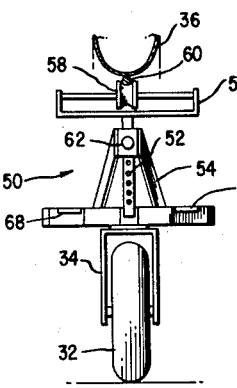
FIGURE 3 is a sectional view taken along line 3—3 of FIGURE 1.

As shown in FIGURES 1 and 2, the longitudinal frame 16 may comprise a pair of rearwardly converging frame members 28 which are pivoted to a pair of arcuate frame members 30 at one end thereof. The arcuate frame members are fixed to and extend between the horizontal portions of the transverse frame members 18 and 20. At the rear of the carriage is a supporting or stabilizing wheel 32 rotatably mounted in a yoke 34 depending from the rear end of the carriage. The upper end of the yoke is preferably pivotally connected to the longitudinal frame for movement about a vertical axis, but may be locked in position if desired, as by a set screw.

In the form shown in FIGURE 1, the elevating conveyor 26 comprises an inclined tubular housing 36 containing a conventional conveyor screw or auger 38 having its drive shaft 39 mounted rotatably in bearings 41 at the ends of the housing (see FIG. 6). The lower end of the housing has an enlarged material receiving chamber 40 open at the front to receive material from the horizontal conveyor. The upper part of the horizontal conveyor is enclosed by a cylindrical hood 42 supported on the transverse frame and extending forwardly and rearwardly as shown in FIGURES 2 and 6. The lower part of the horizontal conveyor is open at the front beneath the hood but is enclosed at the rear by a cylindrical shield 43, which extends rearwardly and upwardly from the blade 22 and is fixed to arcuate frame members 30. The sides of the material receiving chamber 40 have curved forward edges to match the curvature of the hood and shield, which have a stack 40A to admit material to the chamber. The lower end of the housing 36 is fixed to a transverse rod, the ends of which provide a projecting pin 44 at each side thereof (FIG. 1), the pins being freely received within rearwardly and upwardly projecting yokes 46 fixed to arcuate frame members 30. The open ends of the yokes may be closed by locking pins if desired. Chamber 40 may have an inspection door 48.

Intermediate its ends the conveyor housing 36 is supported by an elevating mechanism 50 on the rear of the carriage. This mechanism may comprise an elevating rod 52 movable vertically in a bearing at the top of a bracket 54 fixed to the rear of the carriage. The top of the elevating rod has a yoke 56 rotatably supporting a roller 58 which engages a bar 60 fixed longitudinally to the conveyor housing 36. Reciprocation of the elevating rod 52 varies the elevation of the conveyor 26, the lower end of which accommodates the variation by virtue of the freedom of pins 44 to slide and pivot in yokes 46. The elevating rod may be fixed in position as by a set screw 62.

The discharge spout 64 of the elevating conveyor is located above a suitable material receiver, such as the fertilizer distributor 66 shown in phantom in FIGURE 1. The distributor may be towed from the carriage 12 by providing towing lugs 68 at the sides of the frame members 28.

The horizontal conveyor of the invention is shown in greater detail in FIGURE 5. It comprises a horizontal shaft 70 which turns in bearings 72 supported by the vertical legs of the transverse frame member 18. As shown in FIGURE 4, one end of the shaft extends through its bearing to a drive unit 74 to be described hereinafter. The conveyor comprises groups of blades 76 spaced along the length of the shaft 70. In the form shown each group includes three blades extending outwardly from approximately the same origin on the shaft. Each blade may be a flat sector of a disk with the plane of the blade skewed relative to a radial plane through the blade origin. The blades of each group are skewed in the same direction, preferably at 45 degrees to the radial plane. In order that material may be fed from opposite ends of the shaft 70 toward the center, the blades at one side of the center are skewed in one direction, and the blades at the opposite side of the center are skewed in the reverse direction.

With the foregoing arrangement, the blades 76 serve not only to convey material toward the center of the shaft 70 but also to comminute or pulverize the material as it is moved along the conveyor. The forward portion of hood 42 terminates high enough above the ground to permit the ready admission to the horizontal conveyor of the material scooped up by the blade 22. The hood and the shield 43 cooperate in the conveying and pulverizing operation and limit outward flinging of the material carried by the blades.

As shown in FIGURES 4 and 5, corresponding blades on opposite sides of the central portion of shaft 70 are bridged by trapezoidal webs attached to corresponding straight edges of the adjacent blades. In the form shown there are three webs 120 degrees apart. The webs serve to advance material from the central portion of the horizontal conveyor to the admission chamber 40 of the elevating conveyor, where the material is engaged by the screw 38.

The apparatus of the invention is provided with a three point hook-up for connection to the towing elements of a conventional farm tractor. In the form shown the hook-up comprises a pair of upwardly converging bars 80 (FIG. 4) which are fixed adjacent their lower ends to forwardly projecting channel members 82 fixed to the transverse frame member 18. Bars 80 are angulated and spaced at their upper ends to provide a yoke 84 which receives a towing bar 86 (FIG. 1) extending rearwardly from a pivotal connection to the tractor 88. An adjustable connection may be made at the yoke 84 by means of a pin selectively engaging one of a plurality of openings in the bar 86 and passing through the elements of the yoke 84. The lower ends of the bars 80 may be angulated so as to extend downwardly to support laterally projecting pins 90 which engage towing bars 92 extending rearwardly from pivotal connections to the tractor. Bars 80 may have cross braces 94 as shown in FIGURE 4, and additional support may be provided by oblique braces 96 extending from the frame member 18. The towing mechanism of the tractor is conventional and includes the usual hydraulically actuated linkage 98 for lifting or lowering the bars 92. The actuation of this linkage is effective to raise or lower the blade 22 and to change its inclination.

Motive power for the conveyors 24 and 26 is obtained from the conventional power take-off 100 of the tractor, to which an input shaft 102 is coupled, as by splines. Shaft 102 is connected by a universal joint 104 to the input of a gear reduction unit 106 mounted upon the frame member 18. The gear reduction unit has orthogonal outputs, one of which is connected to a shaft 108 which extends along the frame member 18 through a bearing 107 to the drive unit 74 (FIG. 4) for the horizontal conveyor. The drive unit comprises a sprocket wheel 109 fixed to the shaft 108 and coupled by a chain 110 to a sprocket wheel 111 fixed to the end of shaft 70, the rotation of which is indicated by the arrow B in FIGURE 6.

The other output of the gear reduction unit is connected by a universal joint 112 to a telescoping drive shaft 114, the end of which is connected by another universal joint 116 to a shaft 118 mounted for rotation in bearings 117 on the casing 36 of the elevating conveyor. Shaft 118 extends along casing 36 to the conveyor drive unit 119 at the upper end of the casing. A sprocket wheel 120 fixed to shaft 118 drives a chain 122, which in turn drives a sprocket wheel 124 fixed to the end of the conveyor screw shaft 39.

In the operation of the apparatus of the invention, the loader is coupled to the towing tractor and to the towed material receiver. As the loader moves through a chicken house or over a cow lot, the blade 22 dislodges and collects a wide swath of litter or manure, which is moved and pulverized by the horizontal conveyor 24, lifted by the elevating conveyor 26, and discharged into the material receiver 66. The operation is simple and efficient, and the material is processed quickly and with minimum loss.

Figure 7:
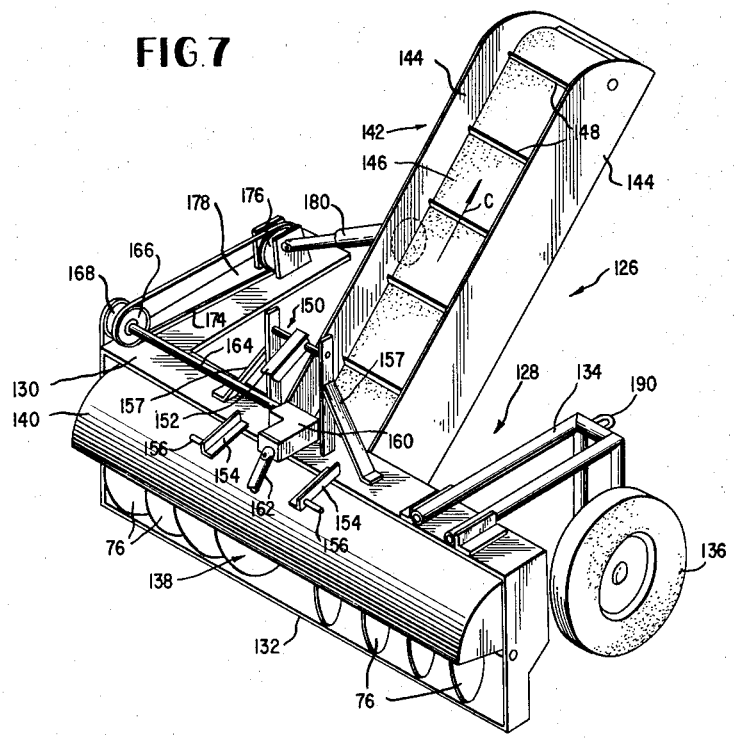
FIGURE 7 is a perspective view of a modified form of the invention.
Figure 8:
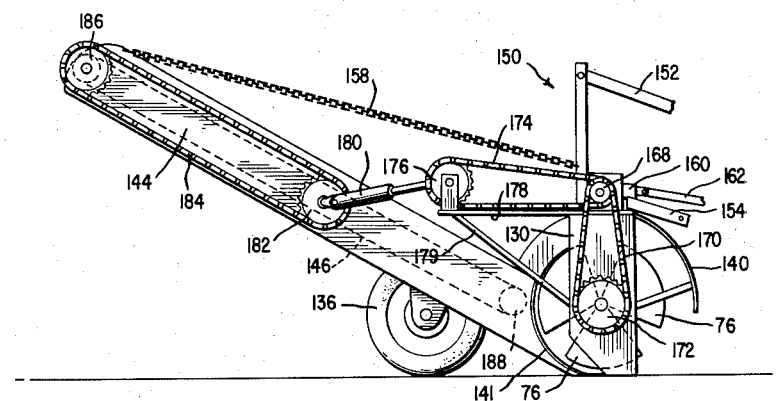
FIGURE 8 is a side elevation view of the apparatus of FIGURE 7.

Although the most preferred form of the invention has been described above, an alternative embodiment will be described in connection with FIGURES 7 and 8 of the drawing. The modified apparatus 126 of the invention includes a carriage 128 with a transverse frame 130 of generally rectangular configuration as shown. The forward edge of the lower extremity of the transverse frame constitutes or supports a blade 132. The carriage has a longitudinal frame 134 fixed to the upper member of the transverse frame and extending rearwardly therefrom at one side thereof. Mounted at the rear of the longitudinal frame is a supporting or stabilizing wheel 136. The transverse frame carries a horizontal conveyor 138 of the type described in connection with the previous embodiment and supports a hood 140 and shield 141 as before. The lower end of an elevating conveyor 142 is fixed to the transverse frame and extends upwardly and rearwardly from the central portion of the horizontal conveyor 138. The elevating conveyor 142 has a pair of enclosing side panels 144 and preferably a bottom panel also. This conveyor is of the continuous belt type having a wide flexible belt 146 with spaced transverse pusher lugs 148. The upper surface of the belt 146 moves upwardly as indicated by the arrow C and carries with it the material scooped up by the blade 132 and fed by the conveyor 138 to the central portion thereof, where the material is supplied to the belt conveyor, as by the webs previously described. The three point hook-up for towing the apparatus 126 from a conventional farm tractor includes a stand 150 having a pivoted towing bar 152, and a pair of forwardly projecting bars 154 having laterally projecting pins 156 which engage the tractor towing assembly in the manner previously described. Stand 150 may be mounted on the upper member of the transverse frame 130 and braced by oblique members 157 as shown. As indicated in FIGURE 8, a chain 158 may extend from the upper portion of the elevating conveyor 142 to a portion of the stand 150 to assist in supporting the elevating conveyor.

The drive train for the conveyors includes a gear reduction box 160 having an input shaft 162 connected thereto by a universal joint and adapted to be coupled to the power take off of the farm tractor. The gear reduction box has an orthogonal output shaft 164 which extends along the transverse frame 130 to a pair of drive sprockets 166 and 168. As shown in FIGURE 8, sprocket 168 is connected by a chain 170 to a driven sprocket 172 fixed to the end of the shaft of the horizontal conveyor. Sprocket 166 is connected by a chain 174 to a sprocket 176 supported on a longitudinal frame member 178, which extends rearwardly from the transverse frame 130 at the side of the elevating conveyor 142 opposite the longitudinal frame 134. Brace 179 assists in the support of the frame member 178. A telescoping shaft 180 has universal joints at its opposite ends, one of which is connected to the sprocket 176 and the other of which is connected to a sprocket 182 mounted on one of the side panels 144. Sprocket 182 is connected by a chain 184 to a sprocket 186 at the top of the elevating conveyor. This sprocket may turn a roller over which the conveyor belt moves, their being an idler roller 188 at the lower end of the conveyor. Alternatively, continuous chains may be fixed to the lateral edges of the belt 146, passing over sprocket wheels at the top and bottom of the conveyor, and these chains may be driven by the shaft on which sprocket 186 is mounted.

Loader 126 is used in the manner previously described, being towed and driven from a conventional farm tractor. The carriage may include couplings, as at 190, for towing a suitable receiver beneath the upper, discharge end of the elevating conveyor.

While preferred embodiments of the invention have been shown and described, it will be apparent to those skilled in the art that changes can be made in these embodiments without departing from the principles and spirit of the invention, the scope of which is defined in the appended claims. Accordingly, the foregoing embodiments are to be considered illustrative, rather than restrictive of the invention, and those modifications which come within the meaning and range of equivalency of the claims are to be included therein.

The invention claimed is:

1. A tractor-towed material-collecting loader comprising a carriage having a transverse frame at the forward end thereof, said transverse frame having a horizontal top member and a pair of side members depending therefrom and having a horizontal conveyor mounted between said side members, said horizontal conveyor comprising blade means supported for rotation on said side members and a tubular housing about said blade means having a material entrance space at the lower-front portion thereof, a horizontally extending material-dislodging blade supported between said side members below said space, said carriage having a longitudinal frame extending rearwardly from said transverse frame with a supporting wheel at its rear end, said longitudinal frame being pivotally connected to said transverse frame for relative movement about a horizontal axis, an elevating conveyor extending rearwardly and upwardly from said horizontal conveyor, said elevating conveyor having an elongated housing with a lower end movably mounted behind the housing of said horizontal conveyor and an intermediate portion supported on said longitudinal frame, said housings having communicating openings through which material is fed from said horizontal conveyor to said elevating conveyor, said top member of said transverse frame having means for coupling said carriage to a towing tractor, said coupling means including means for lifting said transverse frame and changing the angle of said dislodging blade, said horizontal conveyor having drive means at one end thereof and said elevating conveyor having drive means at its upper end, and a power transfer unit mounted on the top member of said transverse frame and adapted to be coupled to a power take-off of said towing tractor, said power transfer unit having output means coupled to both said conveyor drive means.

2. The loader of claim 1, said means for supporting the elongated housing of said elevating conveyor on said longitudinal frame comprising means for varying the inclination of said elongated housing substantially independent of the position of said transverse frame.

3. The loader of claim 2, said tubular housing of said horizontal conveyor having a duct extending into said elongated housing of said elevating conveyor, whereby communication between said housings is maintained for different inclinations of said elongated housing.

4. The loader of claim 2, said tubular housing having a hood extending forwardly at the top thereof above said material entrance space, said conveyor blade means comprising a plurality of groups of skewed sectoral blades having arcuate peripheries adjacent said tubular housing, the blades on opposite sides of the central portion of said tubular housing being oppositely skewed, there being corresponding blades adjacent the central portion of said tubular housing on opposite sides thereof, said corresponding blades having a web extending therebetween adjacent the communicating openings of said housings and adapted to feed material through said communicating openings from said horizontal conveyor to said elevating conveyor.

References Cited in the file of this patent

UNITED STATES PATENTS

| | | |
|---|---|---|
| 1,520,916 | Townsend | Dec. 30, 1924 |
| 2,490,292 | Yost | Dec. 6, 1949 |
| 2,503,522 | Struthers et al. | Apr. 11, 1950 |
| 2,507,742 | Tuft | May 16, 1950 |
| 2,653,701 | Heth | Sept. 29, 1953 |
| 2,724,481 | Oswalt | Nov. 22, 1955 |
| 2,735,199 | Wanner | Feb. 21, 1956 |
| 2,964,158 | Wells | Dec. 3, 1960 |